(12) United States Patent
Kozsar

(10) Patent No.: US 7,635,053 B2
(45) Date of Patent: Dec. 22, 2009

(54) TRANSPORT SYSTEM WITH INDUCTIVE ENERGY TRANSFER

(75) Inventor: Wolfgang Kozsar, Stephanskirchen (DE)

(73) Assignee: Rofa, Kolbermoor (DE)

( * ) Notice: Subject to any disclaimer, the term of this patent is extended or adjusted under 35 U.S.C. 154(b) by 526 days.

(21) Appl. No.: 10/588,038

(22) PCT Filed: Feb. 1, 2005

(86) PCT No.: PCT/EP2005/000985

§ 371 (c)(1),
(2), (4) Date: Aug. 1, 2006

(87) PCT Pub. No.: WO2005/075240

PCT Pub. Date: Aug. 18, 2005

(65) Prior Publication Data

US 2007/0089956 A1   Apr. 26, 2007

(30) Foreign Application Priority Data

Feb. 2, 2004   (EP) .................................. 04002234

(51) Int. Cl.
*B62D 1/00*   (2006.01)
(52) U.S. Cl. ......................................... 191/10; 180/168
(58) Field of Classification Search .................. 191/10; 180/168, 167, 169; 701/23, 207; 307/85; 700/229; 336/119; 318/16, 587

See application file for complete search history.

(56) References Cited

U.S. PATENT DOCUMENTS 5,938,151 A * 8/1999 Takasan et al. ............... 246/194

FOREIGN PATENT DOCUMENTS

| DE | 100 13 767 | * 10/2001 |
|----|------------|-----------|
| DE | 202 09 542 UI | 9/2002 |
| EP | 0 950 558 A1 | 10/1999 |
| GB | 1 309 420 | 3/1973 |
| JP | 07 172359 A | 7/1995 |

* cited by examiner

*Primary Examiner*—Mark T Le
(74) *Attorney, Agent, or Firm*—Alston & Bird LLP

(57) ABSTRACT

A transport system is provided, comprising an underfloor high frequency alternate current primary conductor for providing an electromagnetic field extending along the primary conductor for inductive energy transfer. The transport system includes at least one electric transport vehicle comprising two individually controllable and individually drivable drive wheels. At least one pick-up unit with a secondary conductor for the inductive energy transfer is pivotable relative to the vehicle and comprises at least one idle roller adapted for being continuously contacted with the travel surface. The electric transport vehicle includes a sensor unit adapted for sensing continuously a floor track signal. A control unit is provided to control the two drive wheels in response to signals of the sensor unit for minimizing a deviation of the vehicle from the floor track signal.

19 Claims, 4 Drawing Sheets

TRANSPORT SYSTEM WITH INDUCTIVE ENERGY TRANSFER

TECHNICAL FIELD AND BACKGROUND OF THE INVENTION

The present invention relates to a transport system with inductive energy transfer from an underfloor primary conductor to a secondary conductor in an electric transport vehicle, an electric transport vehicle of such a system, and a method of guiding such a vehicle of such a transport system.

A transport system with inductive energy transfer from an underfloor primary conductor to a secondary conductor in an electric transport vehicle is known from the following patent specification and patent applications: DE 199 47 368 C1, DE 199 55 042 A1, and DE 100 13 767 A1.

The transport systems described in DE 199 47 368 C1 and DE 199 55 042 A1 comprise electric transport vehicles which are guided mechanically. These electric transport vehicles have at least three guide bolts protruding into a guide channel provided in an underfloor track system for engagement and for guidance of the transport vehicles along the track system. Such mechanical guidance has the disadvantage that the track body in which the guide channel is provided is abraded during use. Such abrasion is particularly problematic, in a case wherein heavy loads are transported by the electric transport vehicles, especially in curves of the track system. Hence, regular replacement of the track body comprising the guide channel or at least parts of the track body comprising the guide channel become necessary for operating reliably such transport systems. The replacement of a track body or of major parts of the track body leads to unwanted long down-time of the transport system, and thus to a machine down-time in the whole assembly line in which the transport system is used. Since such transport systems are used in industry, e.g. in the automobile industry, a long down-time of an assembly-line has a large impact on the production costs and thus the efficiency of the manufacture.

The transport system described in DE 100 13 767 A1 comprises electric transport vehicles which are guided optically. However, the electric transport vehicles comprise at least three sensor units for guiding the vehicle and for maintaining a pick-up unit essentially within the electromagnetic field provided by the primary conductor of the track system. Thus, a difficult and complicated control of signals of at least three sensor units is necessary.

Further, transport systems were suggested, wherein the guidance of transport vehicles and their pick-up units essentially within the electromagnetic field of a primary conductor requires a complicated system of rod guided axles, wheels, and pick-up units. Such a system is unreliable and expensive.

Hence, it is the object of the present invention to overcome the drawbacks of the transport systems according to the prior art. Particularly, it is the object of the present invention to provide an improved, inexpensive, and simplified transport system with inductive energy transfer from an underfloor primary conductor to a secondary conductor provided in a transport vehicle, whereby the transport vehicle is guided contact-less, reliably, and essentially within the electromagnetic field of the primary conductor during travel for a maximum of the energy transfer.

SUMMARY OF THE PRESENT INVENTION

The present invention provides under a first aspect a transport system, comprising:

(a) an underfloor high frequency alternate current primary conductor for providing an electromagnetic field extending along said primary conductor for inductive energy transfer, (b) at least one electric transport vehicle comprising:
  (b-1) two individually controllable and individually drivable drive wheels,
  (b-2) at least one pick-up unit with a secondary conductor for said inductive energy transfer, said pick-up unit being pivotable relative to said vehicle and comprising at least one idle roller adapted for being continuously contacted with the travel surface,
  (b-3) a sensor unit adapted for sensing continuously a floor track signal,
  (b-4) a control unit which controls said two drive wheels in response to signals of said sensor unit for minimizing a deviation of said vehicle from said floor track signal,
  whereby said two drive wheels are arranged at a suitable distance in driving direction behind the axis around which the pick-up unit is pivotable for maintaining said pick-up unit essentially within said electromagnetic field during travel for a maximum of said energy transfer.

The primary conductor comprises at least two conductors which are flush-mounted below the travel surface. According to one embodiment of the present invention the at least two conductors constituting the primary conductor are placed in two parallel grooves in the floor, and the two conductors are covered by a preferably pourable sealing or casting compound for electrically insulating the primary conductor. According to a particularly preferred embodiment of the present invention, the transport system comprises a track system with an insulating track body. Preferably, such a track body comprises several track body portions. This embodiment has the advantage that the at least two conductors constituting the primary conductor for inductive energy transfer to a transport vehicle, may be mounted more easily. Namely, the distance between the at least two conductors may be adjusted more easily, and the distance of the primary conductor below the travel surface may be adjusted more easily, since the distances are predetermined by the insulating track body.

The floor track signal of the transport system of the present invention may be provided by the insulating track body. Namely, the insulating track body may present an optical pattern on the floor, e.g. if colored differently, preferably in a color providing a high contrast to the floor. This embodiment has the advantage that no additional means have to be foreseen for providing a floor track signal. According to a further embodiment of the present invention, the floor track signal is provided by an additional track which provides an optical pattern. This additional track may be a foil, strip or a paint which is provided on the insulating track body. Alternatively, such an additional track may be provided beside the insulating track body on the travel surface of the electric transport vehicle. In case that the track floor signal is provided by an optical pattern on the floor or on the underfloor track system, the electric transport vehicle comprises an optical sensor for sensing the optical floor track signal.

According to a particularly preferred embodiment of the present invention, the floor track signal is the electromagnetic field provided by the primary conductor. Then the sensor unit comprises an electromagnetic resonance sensor for sensing the electromagnetic field. This embodiment is particularly preferred, since the floor track signal cannot be disturbed independently from the energy supply of the at least one transport vehicle. Moreover, the whole transport system is simplified.

The sensor unit is preferably provided in the axis around which said pick-up unit is pivotable. This embodiment enables a simplified construction and control of the system and the transport vehicle.

The at least one idle roller may be provided in driving direction behind the axis around which the pick-up unit is pivotable. Preferably, the at least one idle roller is spring biased. This has the advantage that unevenness and roughness of the travel surface may be compensated more easily.

The vehicle may comprise at least one, preferably two, swivelling roller(s). The swivelling rollers may be provided as needed depending on the load which is to be transported by the transport vehicle. Alternatively, one or more than one air cushion(s) may be provided instead of the swivelling roller(s) or in addition or in combination with one or more than one swivelling roller(s).

According to a preferred embodiment of the present invention, the vehicle of the transport system comprises a further pick-up unit which is horizontally pivotable relative to the vehicle around the same axis around which the at least one pick-up unit is horizontally pivotable relative to the vehicle. Thus, the inductive energy transfer from the primary conductor to an electric transport vehicle may be increased. Hence, heavier loads may be transported, or the velocity of the vehicle may be increased. Furthermore, the inductive energy transfer in a run through a curve may be improved.

According to a further preferred embodiment of the present invention, the transport system comprises a second underfloor primary high frequency alternate current conductor for providing a second electromagnetic field extending along said second primary conductor for inductive data transfer. This data transfer may be necessary in order to provide information to a transport vehicle. Such information may be for example information whether the transport vehicle should stop such that work can be conducted on a load carried by the transport vehicle or whether the transport vehicle should start moving again. The second underfloor primary high frequency alternate current conductor is constituted of at least two conductors, like the primary conductor for inductive energy transfer. Preferably, the conductors constituting the second underfloor primary high frequency alternate current conductor are provided between the conductors constituting the primary conductor for inductive energy transfer. Accordingly, a preferred transport vehicle comprises a further secondary conductor provided preferably in the sensor unit for the inductive data transfer. According to a further embodiment of the present invention the conductors constituting the second underfloor primary high frequency alternate current conductor are provided separately and laterally, preferably essentially in parallel, to the conductors constituting the primary conductor for inductive energy transfer. Accordingly, a further preferred transport vehicle may comprise a second pick-up unit with a further secondary conductor for the inductive data transfer. The second pick-up unit is preferably horizontally pivotable relative to the vehicle and comprises at least one idle roller adapted for being continuously contacted with the travel surface. This embodiment has the advantage that no further sensor unit is necessary for controlling the second pick-up unit for a maximum of inductive data transfer. Namely, the second underfloor primary conductor may be provided correspondingly, preferably parallel, to the primary conductor for inductive energy transfer, and the pivotable second pick-up unit may be mounted correspondingly on the under side of the vehicle like the at least one pick-up unit for inductive energy transfer. The second primary conductor may have the same features as the primary conductor for inductive data transfer. Preferably, the alternate current is frequency modulated. It is constituted of at least two conductors preferably provided in an insulating track body. Alternatively, the second primary conductor may be surrounded by a pourable sealing or casting compound as described above with regard to the primary conductor for inductive energy transfer. According to a particular preferred embodiment of the present invention the conductors constituting the primary conductor for the inductive energy transfer and the conductors constituting the second primary conductor are provided in the same insulating track body of a track system. This embodiment represents a particular simplified construction of a transport system having a particular compact design.

Further, the present invention provides under a second aspect of the invention an electric transport vehicle for use in a transport system with an underfloor high frequency alternate current primary conductor for providing an electromagnetic field extending along said primary conductor for inductive energy transfer, said vehicle comprising:

(i) two individually controllable and individually drivable drive wheels,
(ii) at least one pick-up unit with a secondary conductor for said inductive energy transfer, said pick-up unit being pivotable relative to said vehicle and comprising at least one idle roller adapted for being continuously contacted with the travel surface,
(iii) a sensor unit adapted for sensing continuously a floor track signal,
(iv) a control unit which controls said two drive wheels in response to signals of said sensor unit for minimizing a deviation of said vehicle from said floor track signal, whereby said two drive wheels are arranged at a suitable distance in driving direction behind the axis around which the pick-up unit is pivotable for maintaining said pick-up unit essentially within said electromagnetic field during travel for a maximum of said inductive energy transfer.

Preferably, the sensor unit of the transport vehicle of the present invention is provided in the axis around which said pick-up unit is pivotable. Thus, the construction of the transport system and the control of the vehicle is simplified.

Particularly preferred is an embodiment of the transport vehicle which comprises an electromagnetic resonance sensor for sensing an electromagnetic field.

The at least one roller is preferably provided in driving direction behind the axis around which the pick-up unit is pivotable.

The transport vehicle of the present invention may comprise at least one, preferably two, swivelling roller(s) and/or at least one air cushion, depending on the load which is to be transported by the vehicle.

Furthermore, the vehicle of the present invention may comprise further pick-up unit(s) horizontally pivotable relative to the vehicle around the same axis around which the at least one pick-up unit is pivotable relative to the vehicle. Thus, the load to be transported or the velocity of the vehicle may be increased. Moreover, the efficiency of the inductive energy transfer may be improved in a run through a curve or at a junction of the track system.

In a particularly preferred embodiment of the present invention, the transport vehicle comprises a further secondary conductor provided in the sensor unit for inductive data transfer. This embodiment is particularly suited for a system which comprises a second primary conductor for inductive data transfer between the primary conductor for inductive energy transfer.

Further, the vehicle of the present invention may comprise a second pick-up unit with a secondary conductor for inductive data transfer, whereby the second pick-up unit is pivotable relative to the vehicle and comprises at least one idle roller adapted for being continuously contacted with the travel surface. The idle roller may have the same features as the idle roller of the pick-up unit for inductive energy transfer.

Moreover, the present invention provides under a third aspect a method of guiding an electric transport vehicle of a transport system with an underfloor high frequency alternate current primary conductor for providing an electromagnetic field extending along the primary conductor for inductive energy transfer, whereby said vehicle comprises
(i) two individually controllable and individually drivable drive wheels,
(ii) at least one pick-up unit with a secondary conductor for said inductive energy transfer, said pick-up unit being pivotable relative to said vehicle and comprising at least one idle roller adapted for being continuously contacted with the travel surface,
(iii) a sensor unit adapted for sensing continuously a floor track signal,
(iv) a control unit which controls said two drive wheels in response to signals of said sensor unit for minimizing a deviation of said vehicle from said floor track signal, whereby said two drive wheels are arranged at a suitable distance in driving direction behind the axis around which the pick-up unit is pivotable for maintaining said pick-up unit essentially within said electromagnetic field during travel of said vehicle in a course of a curve for a maximum of said inductive energy transfer.

According to a preferred embodiment of the present invention the drive wheels and the idle roller(s) and optionally the swivelling roller(s) comprise hard rubber for increasing the abrasion resistance thereof.

DETAILED DESCRIPTION OF THE PREFERRED EMBODIMENTS

The present invention is now described in further detail with reference to the accompanying drawings. Corresponding or equivalent elements of the transport system of the present invention illustrated in different drawings are designated with the same reference signs.

Figure 1:
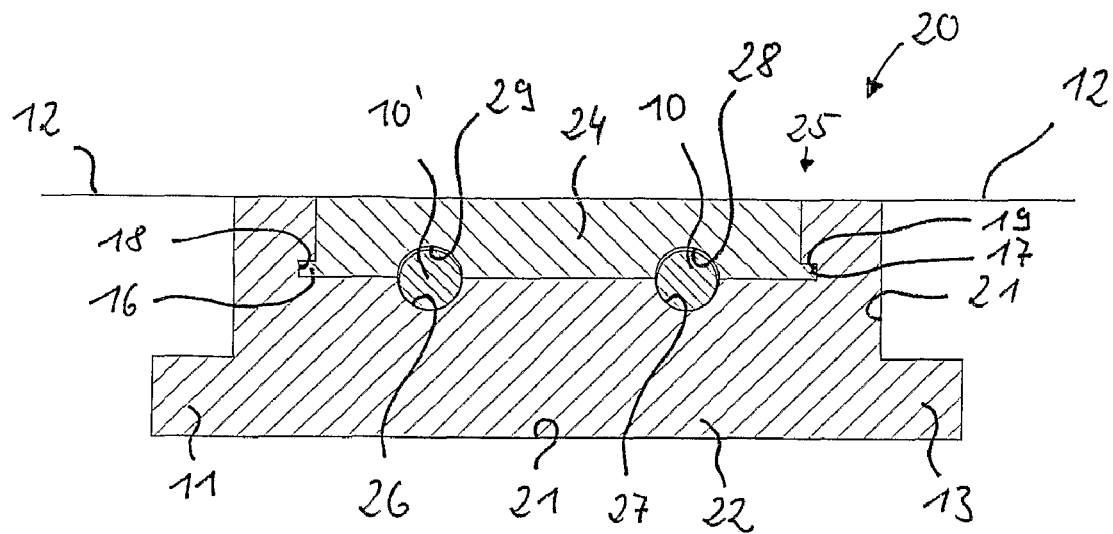
FIG. 1 is a sectional side view of an underfloor track system of a transport system according to the present invention for inductive energy transfer.

FIG. 1 shows a sectional view of an insulating track body 20 of a transport system according to a particularly preferred embodiment of the present invention. The insulating track body comprises a lower part 22 and an upper part 24. The lower part is usually buried in a groove or channel 21 in the floor. The lower part 24 comprises in its top surface parallel grooves 26 and 27. The upper part comprises in its bottom surface parallel grooves 28 and 29 which are complementary in shape to the parallel grooves 26 and 27. "Parallel" means that the grooves 26 and 27, and 28 and 29, respectively, are provided in a constant distance. This means that the grooves are linear parallel on a portion of the track body which is straight or uncurved. Further, the grooves are curved or bent or arcuated correspondingly on a portion of the track body which is curved, such that the grooves have the same distance from each other. The parallel grooves 26, 27, 28, and 29 form two passages in which the electrical conductors 10 and 10' are set. The conductors 10 and 10' are adapted for high frequency alternate current of from 10 to 25 kHz. The conductors 10 and 10' form the so called primary conductor for inductive energy transfer. The insulating body 20 is designed such that its top surface 25 is on the same level with the surface 12 of the floor without providing a hindrance or obstruction to the travel surface of the electric transport vehicle of the present invention. Further, the upper part or lid 24 of the insulating track body comprises the lateral protrusions 16 and 17 which are adapted for a snapping connection with corresponding recesses or grooves 18 and 19 provided in the lower part 22 of the insulating track body. This construction enables easy assembly of the track system, good access to the primary conductor, and easy replacement and repair of the lid 24 or the conductors 10 and/or 10'. Furthermore, the lower part 22 comprises lateral flanges 11 and 13 for improving the stability of the track body in the groove or channel 21. The lateral flanges 11 and 13 may be omitted in other embodiments of the present invention, in case that the insulating body should be replaceable more easily. The lower part 22 may be connected to the groove or channel 21 by conventional connection means such as threads, or it may be glued into the channel, or the flanges 11 and 13 may be covered e.g. by concrete. In a particularly preferred embodiment of the present invention, the lower part 24 may comprise in its top surface two further grooves parallel to and preferably between the grooves 26 and 27. And the upper part 22 may comprises in its bottom surface two further grooves complimentary to the additional grooves in the lower part 24 such that the further grooves form two additional passages in which two electrical conductors constituting a second primary conductor for inductive data transfer may be set.

Figure 2:
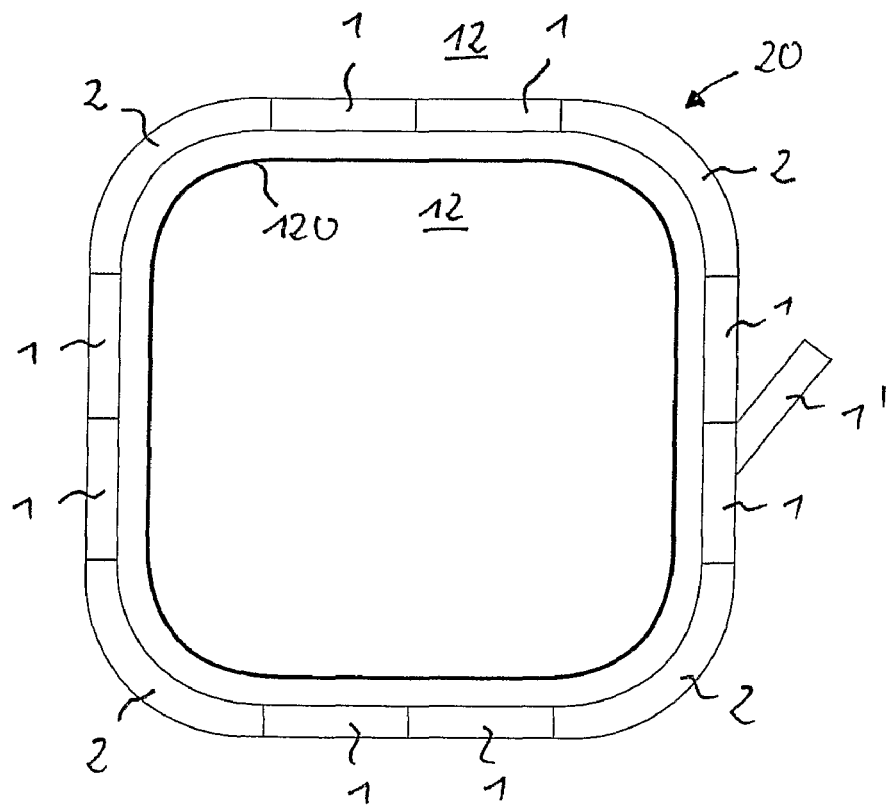
FIG. 2 is a top view of an underfloor track system of a transport system according to the present invention for inductive energy transfer.
Figure 3A:
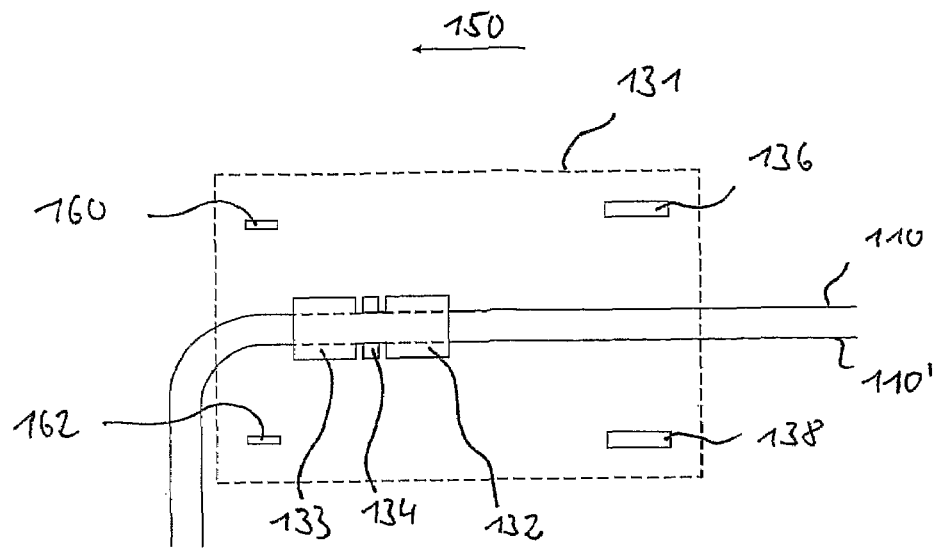
FIG. 3A-C are top views of specific elements of an electric transport vehicle before and during a run through a curve.
Figure 3B:
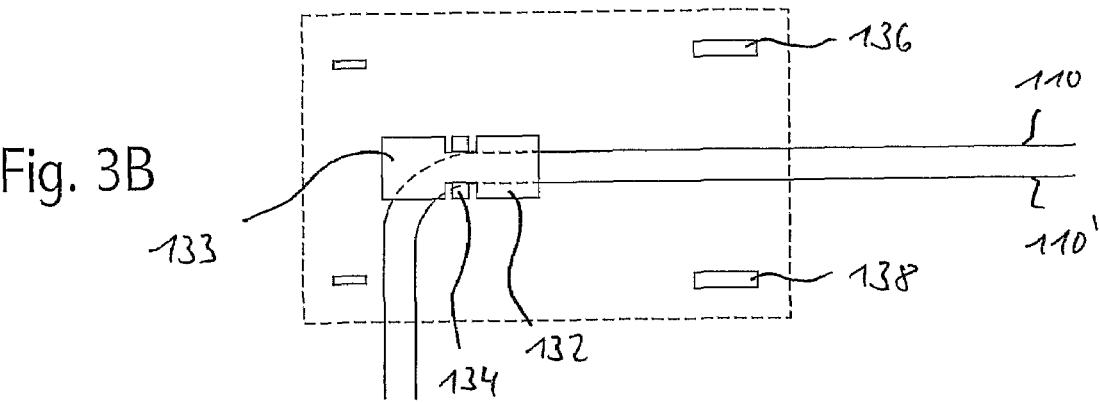
Figure 3C:
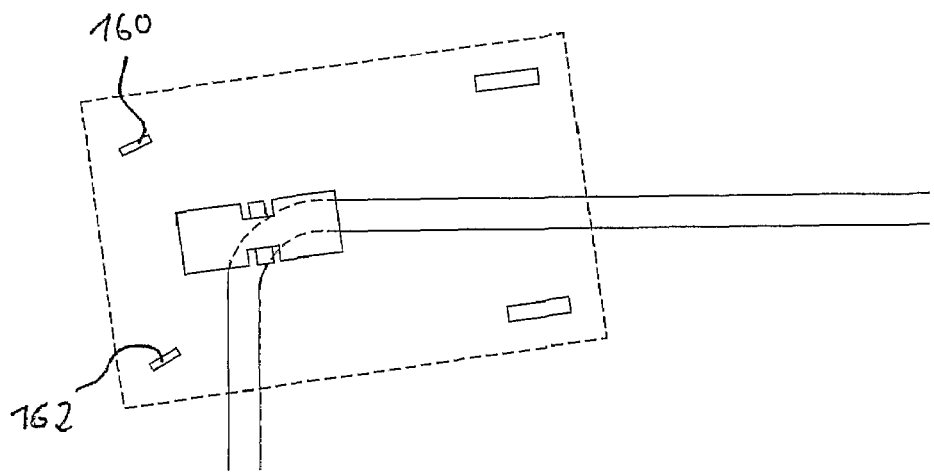

As can be seen in FIG. 2, the insulating track body 20 of the track system of a preferred embodiment of the transport system of the present invention may comprise several track body portions, such as straight track body portions 1 and curved or bent track body portions 2. The track body portions are arranged in tandem or one after the other for constituting an underfloor track system which is flush-mounted relative to the floor such that the top surface of the underfloor track system is on the same level with the surface 12 of the floor. Thus, the underfloor track system is no hindrance or obstruction on the floor. Further, a straight or curved track body portion may be arranged laterally to a straight or a curved track body portion for providing a junction, as illustrated by the straight track body portion 1'. The top surface of the insulating track body may provide an optical pattern on the floor, preferably by having a color differing from the color of the top surface 12 of the floor, preferably in a high optical contrast. The optical pattern may be sensed by an optical sensor. This embodiment has the advantage that no additional means have to be foreseen for providing a floor track signal. According to a further embodiment of the present invention, the floor track signal is provided by the additional track 120 which provides an optical pattern. The additional track 120 may be a foil, strip or a paint which is provided beside the insulating track body 20 on the floor 12. Alternatively, such an additional track may be provided on the insulating track body 20 as described e.g. with regard to FIGS. 2 to 11 in DE 100 13 767 A1 as a strip or foil, optionally formed integrally in the insulating track body 20. In case that the track floor signal is provided by an optical pattern presented on the floor, the electric transport vehicle comprises an optical sensor for sensing the optical floor track signal. According to a particularly preferred embodiment of the present invention, the floor track signal is the electromagnetic field provided by the primary conductor (not shown in FIG. 2), which is illustrated in FIG. 1 (10;10'). Then the sensor unit of the transport vehicle of the present invention comprises an electromagnetic resonance sensor for sensing said magnetic field. The primary conductor may be constituted of at least one pair of conductors 10 and 10'. Preferably, it is constituted of more than one pair of conductors 10 and 10'. The at least one or more pair(s) of conductors 10 and 10' may extend through one or more than one track body portion(s) 1, 2, and/or 1'. FIG. 3A-C show top views of specific elements of a reference transport system before and during a run of a transport vehicle through a curve. The dotted line 131 represents the outer circumference of a loading platform on which the subject which shall be transported by the transport system is loaded or mounted. The subject to be loaded by the transport is usually a machinery or a car or parts of a machinery or a car which is assembled or manipulated at different stages along the track of the transport system. Below the loading platform (illustrated by the dotted line 131) on the bottom side of the transport vehicle are provided two individually controllable and individually drivable drive wheels 136 and 138. The drive wheels 136 and 138 are provided in the stern of the vehicle. Moreover, the transport vehicle includes two pick-up units 132 and 133, each pick-up unit comprising a control system and a secondary conductor for inductive energy transfer from the primary conductor which is formed by the two electric conductors 110 and 110'. The conductors 110 and 110' are provided in an insulating track body (not shown). The two pick-up units are firmly mounted to the transport vehicle. Further, they are provided in the plane through which the longitudinal axis of the vehicle extends. Further, the transport vehicle comprises the sensor unit 134 adapted for sensing continuously a floor track signal. The floor track signal is the electromagnetic field provided by the primary conductor (110; 110'). It extends along the track system. Moreover, the transport vehicle comprises a control unit (not shown) which controls the two individually controllable and individually drivable drive wheels 136 and 138 in response to signals of the sensor unit 134 for minimizing a deviation of said vehicle from the floor track signal. In FIG. 3A the electric transport vehicle is shown on its run towards a curve, i.e. the transport vehicle is shown when moving from the right to the left in the drawings, as indicated by the arrow 150. The pick-up units are positioned symmetrically above the primary conductor provided by the two electric conductors 110 and 110'. Thus, the secondary conductor of each pick-up unit is positioned symmetrically above the electromagnetic field during travel. Hence, there may be a maximum of energy transfer from the primary conductor to the secondary conductor(s) in the electric transport vehicle. FIG. 3B shows the situation when the electric transport vehicle has reached the curve. The pick-up unit 132 is still positioned symmetrically above the electromagnetic field provided by the primary conductor constituted by the two electric conductors 110 and 110' for a maximum of energy transfer. On the other hand, the pick-up unit 133 has only a reduced overlap with regard to the electromagnetic field provided by the primary conductor constituted by the two electric conductors 110 and 110'. Thus, the secondary conductor of the pick-up unit 133 is displaced with regard to the electromagnetic field provided by the primary conductor constituted by the two electric conductors 110 and 110'. Hence, the energy transfer from the primary conductor to the secondary conductor of the pick-up unit 133 is reduced. Further, the sensor unit 134 sensing continuously the electromagnetic floor track signal provided by the primary conductor, senses in the stage shown in FIG. 3B that the floor track signal is stronger on the left hand side in driving direction than on the right hand side in driving direction, since the curve and the primary conductor provided by the two conductors 110 and 110' turn to the left in driving direction. In response to these signals of the sensor unit 134, the control unit controls the two drive wheels 136 and 138 such that the drive of the drive wheel 136 on the right hand side of the vehicle in driving direction is increased with regard to the drive of the drive wheel 138 on the left hand side of the vehicle in driving direction for minimizing a deviation of said vehicle from said floor track signal and in order to drive the vehicle through the curve. Thus, a difference in the drive of the drive wheels 136 and 138 is provided. As a consequence the vehicle turns for a run through the curve as illustrated in FIG. 3C. As can be seen in FIG. 3C the swivelling rollers 160 and 162 are swivelled. Moreover, the overlap between the pick-up unit 133 and the electromagnetic field provided by the primary conductor constituted by the two electric conductors 110 and 110' is further reduced. Hence, the inductive energy transfer is further deteriorated. In case that the transport system is designed such that the electric vehicle is supplied with energy only by inductive energy transfer from the primary conductor to both of the pick-up units, the vehicle is stuck, and the transport system becomes useless. In case that the transport system may be operated also when only one of the two pick-up units 132 and 133 is supplied with energy, e.g. the pick-up unit 132, then the electric energy for operating the primary conductor has to be increased. But this leads to a deterioration of the efficiency due to a large energy loss. Moreover, the vehicle is stuck since a controlled guidance of the vehicle through the curve becomes impossible when the vehicle has reached the stage shown in FIG. 3C. Namely, the sensor unit 134 is too remote from the primary conductor such that the vehicle could be driven completely through the curve.

FIG. 4A-D show top views of specific elements of a transport system according to the present invention before and during a run of a transport vehicle through a curve. The dotted line 31 represents the outer circumference of a loading platform on which a subject which is to be transported by the transport system is loaded or mounted. The subject to be loaded and transported by the transport vehicle of the transport system of the present invention is usually a machinery or a car or parts of a machinery or a car which are assembled or manipulated at different stages along the track of the transport system. The subject to be loaded and transported by one transport vehicle of the present invention may have a weight of up to 50,000 kg, preferably up to 30,000 kg. The transport system of the present invention comprises at least one, usually more than one, electric transport vehicle(s). Two individually controllable and individually drivable drive wheels 36 and 38 are provided beneath the loading platform (illustrated by the dotted line 31) on the bottom side of the transport vehicle. The drive wheels 36 and 38 are provided in the stern of the vehicle. Moreover, the transport vehicle includes two pick-up units 32 and 33. Each pick-up unit 32 and 33 comprises a control system and a secondary conductor for inductive energy transfer from the primary conductor which is formed by the two electric conductors 10 and 10'. The conductors 10 and 10' are provided in an insulating track body (not shown). The two pick-up units are pivotable relative to the vehicle around the axis extending through the center of the pivot bearing or pivot rest 35. The pick-up unit 32 comprises two idle rollers 40 and 41 adapted for being continuously contacted with the travel surface on which the vehicle is driven and on which the drive wheels 36 and 38 and the swivelling rollers 60 and 62 run. The contact of the idle rollers 40 and 41 with the travel surface of the vehicle may be achieved by adjusting the idle rollers properly below or laterally with regard to the pivotable pick-up unit 32. Due to the weight of a pick-up unit comprising a secondary conductor for inductive energy transfer, there is in general no problem that the idle rollers 40 and 41 are continuously contacted with the travel surface, even if the transport vehicle is driven without a load. According to a preferred embodiment of the present invention the idle rollers 40 and 41 may be spring biased. Thus, an uneven or rough travel surface may be advantageously planished or compensated.

Figure 4A:
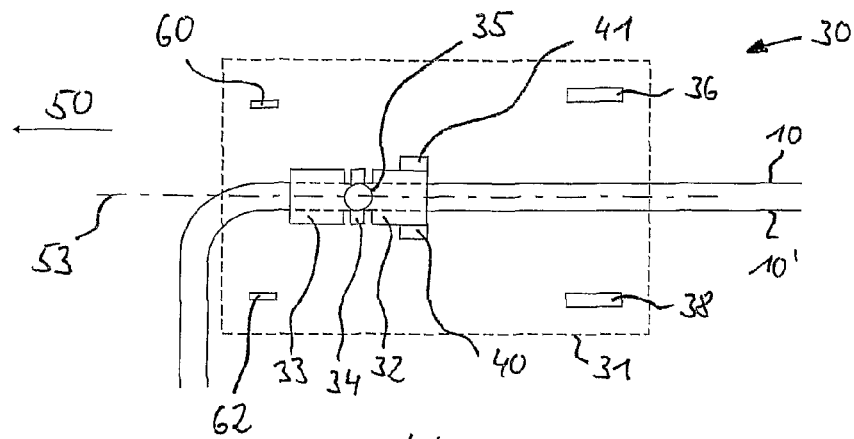
FIG. 4A-D are top views of specific elements of an electric transport vehicle according to the present invention before and during a run through a curve.
Figure 4B:
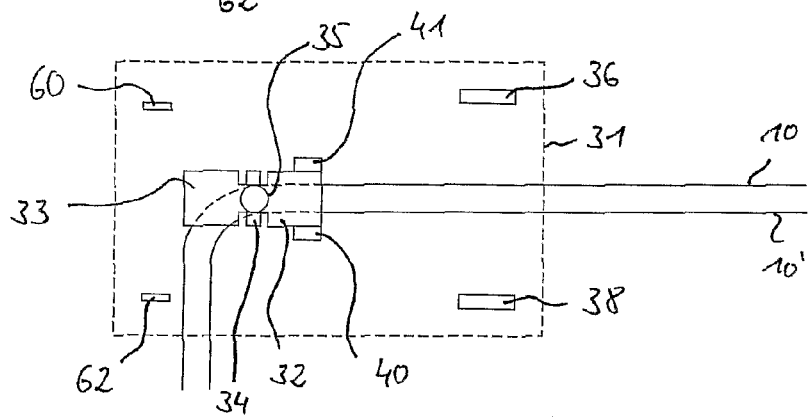
Figure 4C:
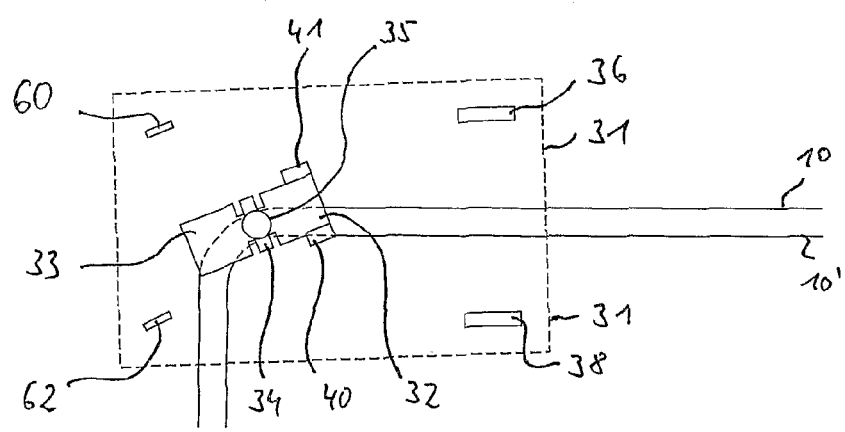
Figure 4D:
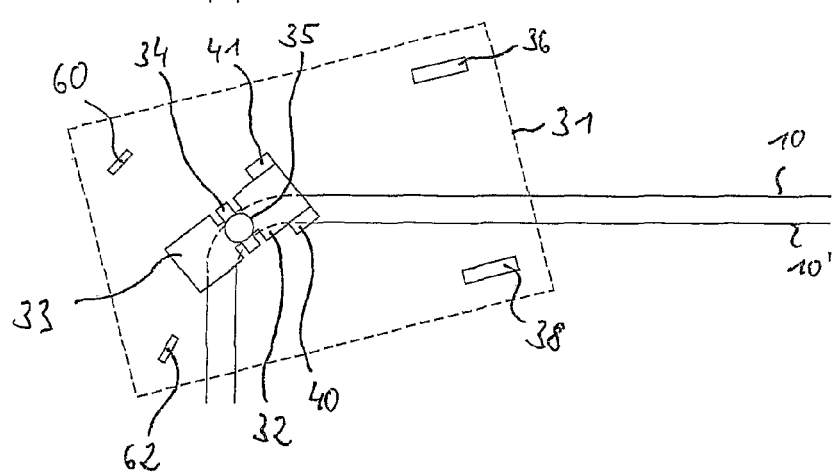

Further, the axis around which the two pick-up units 32 and 33 are pivotable is provided in the plane of the center plane 53 extending longitudinal through the vehicle. The pick-up units are pivotable with regard to this axis which is preferably essentially vertical to the travel surface. Further, the transport vehicle comprises the sensor unit 34 adapted for sensing continuously a floor track signal. The floor track signal is according to the most preferred embodiment of the invention the electromagnetic field provided by the primary conductor (10; 10'). It extends along the track system. Moreover, the transport vehicle comprises a control unit (not shown) which controls the two individually controllable and individually drivable drive wheels 36 and 38 in response to signals of the sensor unit 34 for minimizing a deviation of said vehicle from the floor track signal. In FIG. 4A the electric transport vehicle is shown on its run towards a curve, i.e. the transport vehicle is shown when moving from the right to the left in the drawings, as indicated by the arrow 50. The pick-up units 32 and 33 are centrally above the primary conductor provided by the two electric conductors 10 and 10'. Thus, the secondary conductor of each pick-up unit is positioned symmetrically above the conductors 10 and 10'. Hence, there is a maximum of energy transfer from the primary conductor to the secondary conductor(s) in the electric transport vehicle. FIG. 4B shows a situation wherein the electric transport vehicle has reached the curve. The pick-up unit 32 is still positioned symmetrically above the electromagnetic field provided by the primary conductor constituted by the two electric conductors 10 and 10'. The sensor unit 34 sensing continuously the electromagnetic floor track signal provided by the primary conductor, senses in the stage shown in FIG. 4B that the floor track signal is stronger on the left hand side in driving direction than on the right hand side in driving direction, since the curve and the primary conductor provided by the two conductors 10 and 10' turn to the left in driving direction. In response to the signals of the sensor unit 34, a control unit controls the two drive wheels 36 and 38 such that the drive of the drive wheel 36 on the right hand side of the vehicle in driving direction is changed with regard to the drive of the drive wheel 38 on the left hand side of the vehicle in driving direction for minimizing a deviation of said vehicle from said floor track signal and in order to drive the vehicle through the curve. Thus, a difference in the drive of the two individually controllable and individually drivable drive wheels 36 and 38 is provided. This change in the drive of the two individually drivable and controllable drive wheels with regard to each other may be achieved by increasing the drive of the drive wheel 36 with regard to the drive wheel 38 or by reducing the drive of the drive wheel 38 with regard to the drive wheel 36. According to a further embodiment of the present invention, a difference in the drive of the drive wheels 36 and 38 may be achieved by increasing the drive of the drive wheel 36 and by reducing the drive of the drive wheel 38 in addition or simultaneously. It may be sufficient that the drive wheels 36 and 38 are drivable only in forward motion. According to another embodiment of the present invention, the two individually controllable and individually drivable drive wheels are drivable both in forward motion and in reverse motion. Thus, a difference in the drive of the drive wheels 36 and 38 is provided. When the sensor unit senses no more deviation from the floor track signal the control unit controls the two drive wheels such that the drives of the two wheels are adjusted for matching with each other. In other words, the difference in the drives is counterbalanced or neutralized. Further, the two drive wheels 36 and 38 are arranged at a suitable distance in driving direction behind the axis around which the pick-up unit is pivotable for maintaining the pick-up units 32 and 33 essentially within the electromagnetic field during travel for a maximum of the energy transfer. As a consequence the vehicle turns for a run through the curve as illustrated in FIG. 4C. Moreover, the swivelling rollers 60 and 62 are swivelled, and the pivotable pick-up units 32 and 33 are swivelled around the axis through the pivot bearing or pivot rest 35. Hence the overlap between the pick-up units 32 and 33 and the electromagnetic field provided by the primary conductor constituted by the two electric conductors 10 and 10' is improved when compared to the situation in FIG. 4B and when compared to the situation illustrated in FIG. 3C. Hence, the inductive energy transfer is improved. Therefore, the problem that an electric vehicle gets stuck when running through a curve is eliminated, in case that the transport system is designed such that the electric vehicle is supplied with energy only by inductive energy transfer from the primary conductor to two pick-up units. Moreover, there is no need for increasing the electric energy for operating the primary conductor in order to drive a vehicle through a curve. Thus efficiency of the inductive energy transfer is improved. Moreover, there is no problem of abrasion of the insulating track body, since the electric transport vehicle of the transport system of the present invention is guided contact-less by the electromagnetic field. Furthermore, no complicated and unreliable rod guided design is necessary for guiding the electric transport vehicle along the track system.

Figure 5:
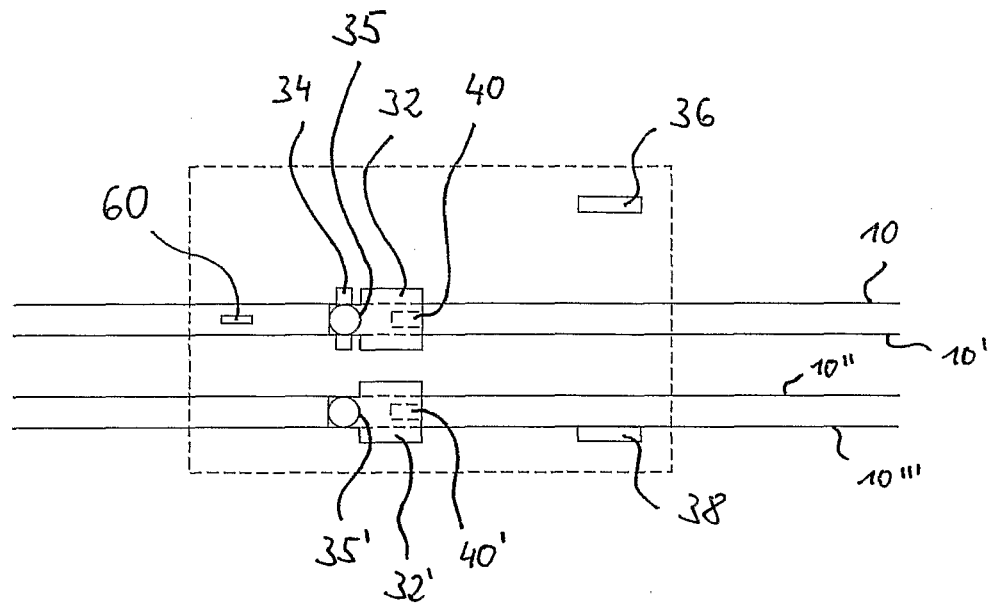
FIG. 5 is a top view of specific elements of a further embodiment of an electric transport vehicle according to the present invention.

FIG. 5 shows a top view of specific elements of a further embodiment of an electric transport vehicle of the present invention. The dotted line 31 represents the outer circumference of a loading platform on which a subject which is to be transported by the transport system is loaded or mounted. Two individually controllable and individually drivable drive wheels 36 and 38 are provided beneath the loading platform (illustrated by the dotted line 31) on the bottom side of the transport vehicle. The drive wheels 36 and 38 are provided in the stern of the vehicle. Moreover, the transport vehicle includes one pick-up unit 32 comprising a control system and a secondary conductor for inductive energy transfer from the primary conductor of an underfloor track system for inductive energy transfer. The pick-up unit 32 is pivotable relative to the vehicle around the axis extending through the center of the pivot bearing or pivot rest 35. Moreover, the pick-up unit 32 comprises one idle roller 40 adapted for being continuously contacted with the travel surface on which the vehicle is driven and on which the drive wheels 36 and 38 and the swivelling roller 60 run. Further, the pivotable pick-up unit 32 is provided centrally in the longitudinal axis of the vehicle. According to another embodiment of the present invention the pick-up unit may be provided offset from the longitudinal axis of the vehicle. Further, the transport vehicle comprises the sensor unit 34 adapted for sensing continuously a floor track signal. Moreover, the transport vehicle comprises a control unit (not shown) which controls the two drive wheels 36 and 38 in response to signals of the sensor unit 34 for minimizing a deviation of the vehicle from the floor track signal. A deviation of the vehicle from the floor track signal may be compensated not only in a run of the vehicle through a curve, but also when the vehicle deviates from the floor track signal on a straight portion of the track system due to an uneven or rough travel surface or a hindrance or obstruction on the travel surface. Furthermore, the transport vehicle comprises a second pick-up unit 32' with a secondary conductor for an inductive data transfer. The second pick-up unit 32' is pivotable relative to the vehicle around the axis extending through the center of the pivot bearing or pivot rest 35'. Moreover, the pick-up unit 32' comprises the idle roller 40' adapted for being continuously contacted with the travel surface. The transport system of this embodiment comprises a second underfloor primary high frequency alternate current conductor constituted of the two conductors 10" and 10'" providing a second electromagnetic field extending along the second primary conductor for inductive data transfer. This embodiment has the advantage that an optimum of inductive data transfer is provided without a further control means and sensor unit, since the second pick-up unit is maintained advantageously above the second primary conductor constituted by the conductors 10" and 10'" for a maximum of inductive data transfer also in a run of the vehicle through a curve. A deviation of the second pick-up unit 32' from the course of the second primary conductor is compensated through the operation of the sensor unit 34. This simplifies the system and the transport vehicle further. A deviation of the second pick-up unit 32' from the course of the second primary conductor 10", 10'" is avoided not only in a run of the vehicle through a curve, but also when the vehicle deviates from the floor track signal on a straight portion of the track system due to an uneven or rough travel surface or a hindrance or obstruction on the travel surface. Thus, the reliability of data transfer is advantageously attained with a simple construction of the vehicle and the transport system. The second primary conductor 10", 10'" is located separately and laterally and in parallel to the primary conductor 10, 10', like the track 120 with regard to the track body 20 shown in FIG. 2. According to a further embodiment of the present invention, the conductors 10", 10'" constituting a second primary conductor are provided between the conductors 10 and 10' constituting the primary conductor for inductive energy transfer. The transport system may have an insulating track body comprising conduits for the conductors 10 and 10' of the primary conductor for inductive energy transfer and conduits for the conductors 10" and 10'" of the second primary conductor. According to a particularly preferred embodiment of the present invention, the conductors 10" and 10'" are provided between the conductors 10 and 10' in the same track body. Accordingly, a particularly preferred embodiment of a transport vehicle of the present invention comprises a further secondary conductor which is provided in the sensor unit 34 for inductive data transfer.

Figure 6:
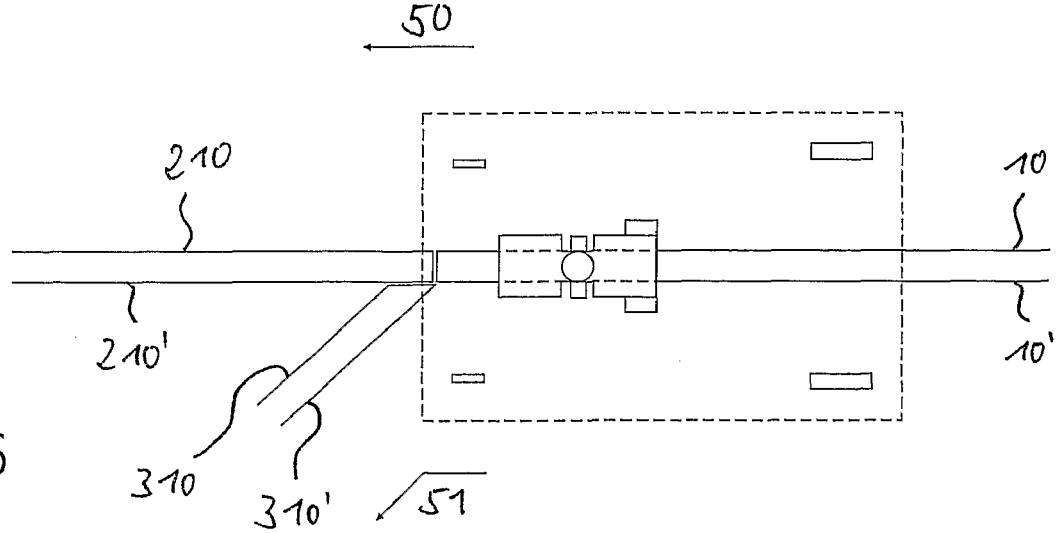
FIG. 6 is a top view of specific elements of an electric transport vehicle according to the present invention at a junction of a track system.

FIG. 6 shows a top views of specific elements of a transport system according to the present invention before reaching a junction of an underfloor track system. The transport vehicle corresponds to the vehicle shown and described with regard to FIG. 4A-D. Besides the pair of conductors 10 and 10', there are provided the pair of conductors 210 and 210' and the pair of conductors 310 and 310'. All these pairs of conductors constitute the primary conductor of the track system of the present invention. The insulating track body and the track body portions of the underfloor track system are not shown. In case that the transport vehicle shall follow the track in straight direction from the right side to the left side on the drawing, as indicated by arrow 50, the conductors 10, 10', 210, and 210' are made alive. In case that the transport vehicle shall turn to the left hand side in driving direction at the junction, as indicated by arrow 51, the conductors 10, 10', 310, and 310' are made alive. Thus, it is possible to guide the transport vehicle of the present invention along the electromagnetic field provided by the primary conductor of the underfloor track system of the present invention. The construction of the transport vehicle as described with regard to FIG. 4A-D or FIG. 5 enables a maximum of energy transfer from the primary conductor to the secondary conductor in the vehicle when the transport vehicle of the present invention passes a junction. Further, simple guiding of the transport vehicle is attained.

The invention claimed is:

1. A transport system, comprising:
   (a) an underfloor high frequency alternate current primary conductor for providing an electromagnetic field extending along said primary conductor for inductive energy transfer;
   (b) at least one electric transport vehicle comprising:
     (b-1) two individually controllable and individually drivable drive wheels;
     (b-2) at least one pick-up unit with a secondary conductor for said inductive energy transfer, said pick-up unit being pivotable relative to said vehicle and comprising at least one idle roller adapted for being continuously contacted with a travel surface;
     (b-3) a sensor unit adapted for sensing continuously a floor track signal; and
     (b-4) a control unit which controls said two drive wheels in response to signals of said sensor unit for minimizing a deviation of said vehicle from said floor track signal; and
   wherein said two drive wheels are arranged at a suitable distance in a driving direction behind the axis around which the pick-up unit is pivotable for maintaining said pick-up unit essentially within said electromagnetic field during travel for a maximum of said energy transfer.

2. The transport system according to claim 1, wherein said floor track signal is said electromagnetic field provided by the primary conductor and said sensor unit comprises a magnetic resonance sensor for sensing said magnetic field.

3. The transport system according to claim 1, wherein said sensor unit is provided in the axis around which said pick-up unit is pivotable.

4. The transport system according to claim 1, wherein said at least one idle roller is provided in driving direction behind the axis around which the pick-up unit is pivotable.

5. The transport system according to claim 1, wherein said vehicle comprises at least one swivelling roller.

6. The transport system according to claim 1, wherein said vehicle comprises a further pick-up unit which is horizontally pivotable relative to said vehicle around the same axis around which the at least one pick-up unit is horizontally pivotable relative to said vehicle.

7. The transport system according to claim 1, wherein said primary conductor is provided in an insulating track body of a track system.

8. The transport system according to claim 1, which further comprises a second underfloor primary high frequency alternate current conductor for providing a second electromagnetic field extending along said second primary conductor for inductive data transfer.

9. The transport system according to claim 8, wherein said vehicle comprises a further secondary conductor provided in said sensor unit for said inductive data transfer.

10. The transport system according to claim 8, wherein said vehicle comprises a second pick-up unit with a further secondary conductor for said inductive data transfer, said second pick-up unit being pivotable relative to said vehicle and comprising at least one idle roller adapted for being continuously contacted with the travel surface.

11. An electric transport vehicle for use in a transport system with an underfloor high frequency alternate current primary conductor for providing an electromagnetic field extending along said primary conductor for inductive energy transfer, said vehicle comprising:
  (i) two individually controllable and individually drivable drive wheels;
  (ii) at least one pick-up unit with a secondary conductor for said inductive energy transfer, said pick-up unit being pivotable relative to said vehicle and comprising at least one idle roller adapted for being continuously contacted with a travel surface;
  (iii) a sensor unit adapted for sensing continuously a floor track signal; and
  (iv) a control unit which controls said two drive wheels in response to signals of said sensor unit for minimizing a deviation of said vehicle from said floor track signal; and
  wherein said two drive wheels are arranged at a suitable distance in a driving direction behind the axis around which the pick-up unit is pivotable for maintaining said pick-up unit essentially within said electromagnetic field during travel for a maximum of said inductive energy transfer.

12. The vehicle according to claim 11, wherein said sensor unit comprises an electromagnetic resonance sensor for sensing an electromagnetic field.

13. The vehicle according to claim 11, wherein said sensor unit is provided in the axis around which said pick-up unit is pivotable.

14. The vehicle according to claim 11, wherein said at least one roller is provided in driving direction behind the axis around which the pick-up unit is pivotable.

15. The vehicle according to claim 11, wherein said vehicle comprises at least one swivelling roller.

16. The vehicle according to claim 11, wherein said vehicle comprises a further pick-up unit which is horizontally pivotable relative to said vehicle around the same axis around which the at least one pick-up unit is pivotable relative to said vehicle.

17. The vehicle according to claim 11, wherein said vehicle comprises a further secondary conductor provided in said sensor unit for said inductive data transfer.

18. The vehicle according to claim 11, wherein said vehicle comprises a second pick-up unit with a further secondary conductor for inductive data transfer, said second pick-up unit being pivotable relative to said vehicle and comprising at least one idle roller adapted for being continuously contacted with the travel surface.

19. A method of guiding an electric transport vehicle of a transport system with an underfloor high frequency alternate current primary conductor for providing an electromagnetic field extending along said primary conductor for inductive energy transfer, the method comprising:
  providing an electric transport vehicle comprising:
    (i) two individually controllable and individually drivable drive wheels;
    (ii) at least one pick-up unit with a secondary conductor for said inductive energy transfer, said pick-up unit being pivotable relative to said vehicle and comprising at least one idle roller adapted for being continuously contacted with a travel surface;
    (iii) a sensor unit adapted for sensing continuously a floor track signal; and
    (iv) a control unit which controls said two drive wheels in response to signals of said sensor unit for minimizing a deviation of said vehicle from said floor track signal; and
  arranging said two drive wheels at a suitable distance in a driving direction behind the axis around which the pick-up unit is pivotable for maintaining said pick-up unit essentially within said electromagnetic field during travel of said vehicle in a course of a curve for a maximum of said inductive energy transfer.

* * * * *

UNITED STATES PATENT AND TRADEMARK OFFICE
CERTIFICATE OF CORRECTION

PATENT NO.      : 7,635,053 B2
APPLICATION NO. : 10/588038
DATED           : December 22, 2009
INVENTOR(S)     : Wolfgang Kozsar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 668 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,635,053 B2
APPLICATION NO. : 10/588038
DATED : December 22, 2009
INVENTOR(S) : Kozsar It is certified that error appears in the above-identified patent and that said Letters Patent is hereby corrected as shown below:

On the face of the patent, please amend the Assignee (73) to read as follows:

--ROFA Rosenheimer Förderanlagen GmbH--

Signed and Sealed this
Second Day of August, 2011

David J. Kappos
*Director of the United States Patent and Trademark Office*